United States Patent
Chen

(10) Patent No.: US 11,206,837 B2
(45) Date of Patent: Dec. 28, 2021

(54) MULTIFUNCTIONAL AUTOMATIC NOODLE MAKER

(71) Applicant: Yusheng Chen, Guangdong (CN)

(72) Inventor: Yusheng Chen, Guangdong (CN)

( * ) Notice: Subject to any disclaimer, the term of this patent is extended or adjusted under 35 U.S.C. 154(b) by 0 days.

(21) Appl. No.: 17/169,546

(22) Filed: Feb. 8, 2021

(65) Prior Publication Data

US 2021/0153510 A1   May 27, 2021

(30) Foreign Application Priority Data

Dec. 31, 2020  (CN) .......................... 202011638597.4

(51) Int. Cl.
| | | |
|---|---|---|
| *A21C 11/24* | (2006.01) | |
| *B26D 3/24* | (2006.01) | |
| *A21C 11/10* | (2006.01) | |
| *A21C 11/22* | (2006.01) | |

(52) U.S. Cl.
CPC .............. *A21C 11/24* (2013.01); *A21C 11/10* (2013.01); *A21C 11/22* (2013.01); *B26D 3/24* (2013.01)

(58) Field of Classification Search
CPC .......... A21C 11/10; A21C 11/22; A21C 11/24
See application file for complete search history.

(56) References Cited

U.S. PATENT DOCUMENTS

| | | | | |
|---|---|---|---|---|
| 5,770,239 A | * | 6/1998 | Ancona ................... | A21C 11/22 366/309 |
| 6,003,437 A | * | 12/1999 | Lu .......................... | A21C 11/22 425/190 |
| 2005/0257692 A1 | * | 11/2005 | Marcato ................... | A21C 3/02 99/353 |
| 2020/0129010 A1 | * | 4/2020 | Voss ........................ | A47J 43/06 |

FOREIGN PATENT DOCUMENTS

WO   WO2009/141699   * 11/2009

OTHER PUBLICATIONS

Marcato, Atlas 150 (see Wayback Machine for publishing date) https://www.marcato.it/sites/default/files/node/documentation/files/2018-01/Marcato_Atlas_150.pdf (Year: 2020).*
Wayback Machine publishing date for Atlas 150 manual http://web.archive.org/web/2020*/https://www.marcato.it/sites/default/files/node/documentation/files/2018-01/Marcato_Atlas_150.pdf (Year: 2020).*

* cited by examiner

*Primary Examiner* — Timothy Kennedy
*Assistant Examiner* — Alexander A Wang

(57) ABSTRACT

The present invention relates to a multifunctional automatic noodle maker, including a housing; a rolling mechanism, wherein the rolling mechanism includes two rolling barrels, and a rolling spacing is defined between the two rolling barrels; and a plurality of sets of cutting mechanisms, wherein each set of the plurality of sets of cutting mechanisms includes two cutting rollers, cutting grooves are provided in each cutting roller, and cutting rings are formed between adjacent cutting grooves. In each set of cutting mechanisms, the cutting grooves of any cutting roller are aligned with the cutting rings of another cutting roller. The cutting grooves of the plurality of sets of cutting mechanisms are different in widths. A rolling inlet and a cutting inlet are provided in a top portion of the housing, and rolling outlets and cutting outlets are provided in a bottom portion of the housing.

18 Claims, 7 Drawing Sheets

MULTIFUNCTIONAL AUTOMATIC NOODLE MAKER

BACKGROUND OF THE INVENTION

The present invention relates to the technical field of noodle makers, particularly to a multifunctional automatic noodle maker.

Pastas have always been one of the staple diets in people's lives. Pastas basically serve as a complete staple diet in most areas around the world.

There are many kinds of pastas, mainly noodles. The noodles are made by mixing flour with water, kneading, forming a dough and drawing or cutting the dough.

In the prior art, in order to efficiently make the noodles, there are various noodle makers on the market. Moreover, the spread dough sheet may be automatically cut into noodles. Accordingly, the making efficiency is greatly increased. However, the existing noodle maker has a single function, and is capable of making noodles with a single width only, resulting in poor applicability. Hence, various requirements for making the noodles may not be met.

BRIEF SUMMARY OF THE INVENTION

An objective of the present invention is to provide a multifunctional automatic noodle maker, aiming at solving the problems of single function and poor applicability of the noodle maker in the prior art.

The present invention is achieved as follows. The multifunctional automatic noodle maker includes a housing; a rolling mechanism disposed inside the housing, wherein the rolling mechanism includes two rolling barrels, and the two rolling barrels are arranged in parallel and spaced apart, and a rolling spacing is defined between the two rolling barrels; and a plurality of sets of cutting mechanisms, wherein each set of the plurality of sets of cutting mechanisms includes two cutting rollers which are arranged in parallel and spaced apart, cutting grooves surrounding a circumferential direction of each cutting roller is disposed on the cutting roller, and cutting rings are formed between adjacent cutting grooves; in each set of cutting mechanisms, the cutting grooves of any cutting roller are aligned with the cutting rings of another cutting roller, wherein the cutting grooves of the plurality of sets of cutting mechanisms are different in widths; wherein a rolling inlet corresponding to the rolling mechanism is provided in a top portion of the housing, and a rolling inlet corresponding to the rolling mechanism is provided in a bottom portion of the housing; and cutting inlets corresponding to the cutting mechanisms are provided in the top portion of the housing, and cutting outlets corresponding to the cutting mechanisms are provided in the bottom portion of the housing.

In some embodiments, the multifunctional automatic noodle maker further includes a motor, wherein the two rolling barrels include a driving rolling barrel and a driven rolling barrel, the driving rolling barrel has a first end and a second end which are opposite, the driven rolling barrel has a first end and a second end which are opposite, the first end of the driving rolling barrel and the first end of the driven rolling barrel are arranged in the same direction, the second end of the driving rolling barrel and the second end of the driven rolling barrel are arranged in the same direction, the first end of the driving rolling barrel extends to an outer side of the housing and is connected with the motor, the motor drives the driving rolling barrel to rotate, the second end of the driving rolling barrel is in driving connection with the second end of the driven rolling barrel, and the driving rolling barrel and the driven rolling barrel roll in different directions synchronously.

In some embodiments, the plurality of sets of cutting mechanisms include a first cutting mechanism and a second cutting mechanism, the first cutting mechanism and the second cutting mechanism are respectively arranged on two sides of the two rolling barrels, the second end of the driving rolling barrel is connected with and used to drive one cutting roller adjacent to it in the second cutting mechanism, and the second end of the driven rolling barrel is connected with and used to drive one cutting roller adjacent to it in the first cutting mechanism.

In some embodiments, in each of the cutting mechanisms, the two cutting rollers each have a first end and a second end which are opposite, a first end of each cutting roller and the first end of the driving rolling barrel are arranged in the same direction, and the first ends of the two cutting rollers are in driving connection with each other.

In some embodiments, two sides of each cutting outlet of the housing are respectively provided with two guiding bars, and two of the guiding bars are arranged to respectively extend along an axial direction of two of the cutting rollers positioned at two sides of the cutting outlet, a plurality of guiding blocks are convexly arranged on the guiding bars, and the plurality of guiding blocks are arranged at intervals along an axial direction of the guiding bars, the plurality of guiding blocks are aligned with the plurality of cutting grooves of the cutting rollers, an upper portion of each guiding block extends into a corresponding cutting groove and abuts against an inner side wall of the cutting groove in a radial direction, and a lower portion of the guiding block extends towards the cutting outlet.

In some embodiments, two sides of the rolling outlet of the housing are respectively provided with two guiding sheets, and two of the guiding sheets are arranged to respectively extend along an axial direction of the rolling barrels positioned on two sides of the rolling outlet, and the two guiding sheets respectively fit with the two rolling barrels.

In some embodiments, in each of the cutting mechanisms, the cutting rings of any cutting roller are embedded in the cutting grooves of another cutting roller, an interval is provided between top portions of the cutting rings and bottom portions of the corresponding cutting grooves in a radial direction of the cutting rollers, and gaps are provided between two side edges of the cutting rings and two side walls of the corresponding cutting grooves in an axial direction of the cutting rollers.

In some embodiments, the driven rolling barrel includes an outer sleeve and a center shaft, wherein the center shaft and the outer sleeve are arranged coaxially, the center shaft is disposed in the outer sleeve in a penetrating manner and is capable of rotating relative to the outer sleeve, and one end portion of the center shaft passes through an end portion of the outer sleeve, so that an operating section rotatably connected onto the housing is formed; and the operating section and the center shaft are eccentrically arranged, the operating section rotates to drive the center shaft to eccentrically rotate, and the center shaft eccentrically rotates to drive the driven rolling barrel to move towards or away from the driving rolling barrel.

In some embodiments, the multifunctional automatic noodle maker further includes a plurality of gears, wherein the first gear is fixed on the second end of the driving rolling barrel, the second gear is fixed on the second end of the driven rolling barrel, the third gear is fixed on the cutting roller which is in driving connection with the second end of the driving rolling barrel, the fourth gear is fixed on the cutting roller which is in driving connection with the second end of the driven rolling barrel, the third gear, the first gear, the second gear and the fourth gear are arranged in sequence in a radial direction and meshed with each other, wherein first ends of the two cutting rollers of each of the cutting mechanism are in driving connection by one set of the plurality of gears.

In some embodiments, the housing includes an upper housing and a lower housing, wherein an opening is provided in one side of the lower housing, the upper housing is adapted to be connected with the lower housing and to close the opening, the upper housing and the lower housing jointly surround and define a receiving cavity, and the rolling mechanism and the plurality of cutting mechanisms are arranged side by side in the receiving cavity.

In some embodiments, the lower housing includes a first mounting plate and a second mounting plate that are arranged oppositely, wherein the first end of the driving rolling barrel, the first end of the driven rolling barrel and first ends of two cutting rollers of each of the cutting mechanisms are rotatably disposed in the first mounting plate in a penetrating manner, the second end of the driving rolling barrel, the second end of the driven rolling barrel, and second ends of the two cutting rollers of each of the cutting mechanisms are rotatably disposed in the second mounting plate in a penetrating manner.

In some embodiments, the multifunctional automatic noodle maker further includes a first panel and a second panel which are disposed on the lower housing, wherein the first panel and the first mounting plate are arranged side by side and spaced apart, and at least two mutually-meshed gears of the plurality of gears are disposed between the first panel and the first mounting plate; and the second panel and the second mounting plate are arranged side by side and spaced apart, and at least two mutually-meshed gears of the plurality of gears are disposed between the second panel and the second mounting plate.

In some embodiments, cross-sectional sizes of openings of the rolling inlet and the cutting inlets gradually decrease from an outer side of the housing to an inner side of the housing.

In some embodiments, the multifunctional automatic noodle maker further includes a plurality of supporting rods, wherein each of the supporting rods is arranged corresponding to one of the guiding bars, and each of the supporting rods and one of the cutting rollers jointly define one of the guiding bars between the supporting rod and the cutting roller.

In some embodiments, the multifunctional automatic noodle maker further includes two supporting sheets, wherein each of the supporting sheets is connected with one of the guiding sheets through an elastically deformable elastic member.

In some embodiments, the multifunctional automatic noodle maker further includes a knob, wherein the knob is fixedly connected with the operating section of the center shaft.

In some embodiments, a cross section of the first end of the driving rolling barrel is square.

In some embodiments, the knob includes measuring scales arranged in a rotating direction, and a pointer aligned with the measuring scale is disposed on the second panel.

In some embodiments, the operating section further includes a positioning port extending in an axial direction of the center shaft.

In some embodiments, the first panel further includes a protecting cylinder extending in an axial direction of the driving rolling barrel, and the first end of the driving rolling barrel passes through and protrudes from the protecting cylinder.

Compared with the prior art, the multifunctional automatic noodle maker provided by the present invention is capable of rolling the dough into a dough sheet by providing two rolling barrels, and is provided with a plurality of sets of cutting mechanisms with different cutting grooves. In this way, it is necessary for suitable cutting mechanisms to cut noodles according to actual needs. The dough may be squeezed and noodles with different widths may be made on the same noodle maker. Therefore, the multifunctional automatic noodle maker has multiple functions and wide applicability.

DETAILED DESCRIPTION OF THE INVENTION

Figure 1:
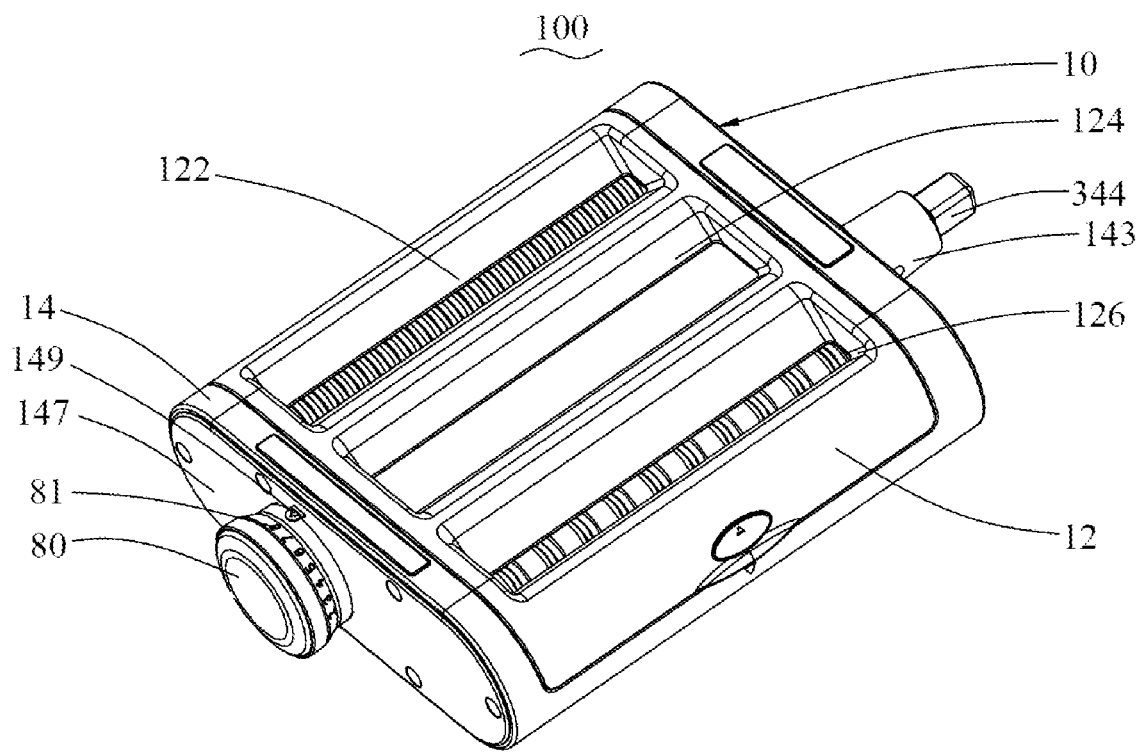
FIG. 1 is a schematic perspective view showing a top surface of a multifunctional automatic noodle maker according to an embodiment of the present invention.
Figure 2:
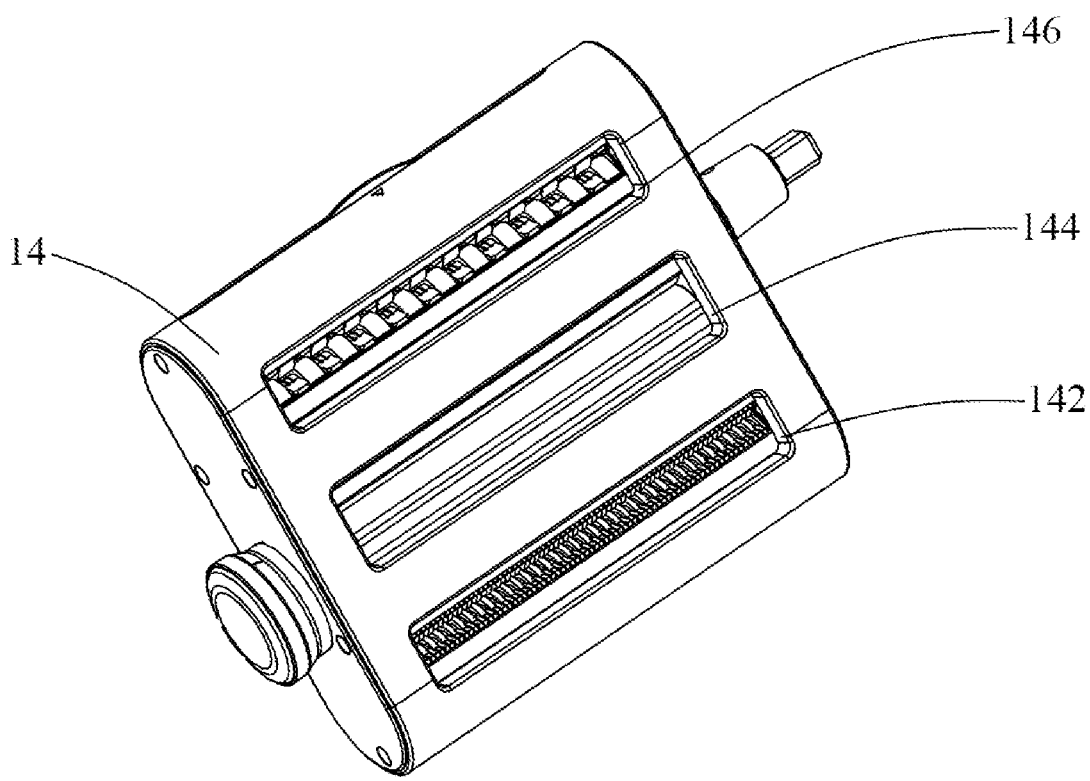
FIG. 2 is a schematic perspective view showing a bottom surface of a multifunctional automatic noodle maker in FIG. 1.

In order to make the objective, the technical solution and advantages of the present invention clearer, the following further describes the present invention in detail with reference to accompanying drawings and embodiments. It should be understood that specific embodiments described herein are only used to explain the present invention, but not to limit the present invention.

The implementation of the present invention will be described in detail below in conjunction with the specific embodiments.

The same or similar reference numbers in the accompanying drawings of this embodiment correspond to the same or similar components. In the description of the present invention, it should be understood that if an orientational or positional relationship indicated by terms "upper", "lower", "left", "right" and the like is based on an orientational or positional relationship shown in the accompanying drawings, and is only for the convenience of describing the present invention and simplifying the description, rather than indicating or implying that the indicated apparatus or element must have a specific orientation or must be constructed and operated at a specific orientation, therefore, the terms describing the positional relationship in the accompanying drawings are only for exemplary description, and cannot be understood as a limitation of the patent. For those ordinarily skilled in the art, specific meanings of the above terms may be understood according to specific circumstances.

FIG. 1 to FIG. 4 show a multifunctional automatic noodle maker 100 according to an embodiment of the present invention. The multifunctional automatic noodle maker 100 includes a housing 10. In this embodiment, the housing 10 is of a substantially rectangular parallelepiped shape. A rolling mechanism 30 and a plurality of sets of cutting mechanisms 20, 40 are disposed inside the housing 10. In this embodiment, the first cutting mechanism 20 and the second cutting mechanism 40 are included. The first cutting mechanism and the second cutting mechanism are positioned on two sides of the rolling mechanism. The rolling mechanism 30 includes a driving rolling barrel 34 and a driven rolling barrel 32 that are substantially cylindrical and arranged in parallel and spaced apart. The first cutting mechanism 20 and the second cutting mechanism 40 each include two cutting rollers which are arranged in parallel and spaced apart. The first cutting mechanism 20 includes a first cutting roller 22 and a second cutting roller 24. The second cutting mechanism 40 includes a third cutting roller 42 and a fourth cutting roller 44. In this embodiment, the first cutting roller 22, the second cutting roller 24, the driven rolling barrel 32, the driving rolling barrel 34, the third cutting roller 42 and the fourth cutting roller 44 are roughly arranged on the same plane in parallel and spaced apart from each other.

Figure 5:
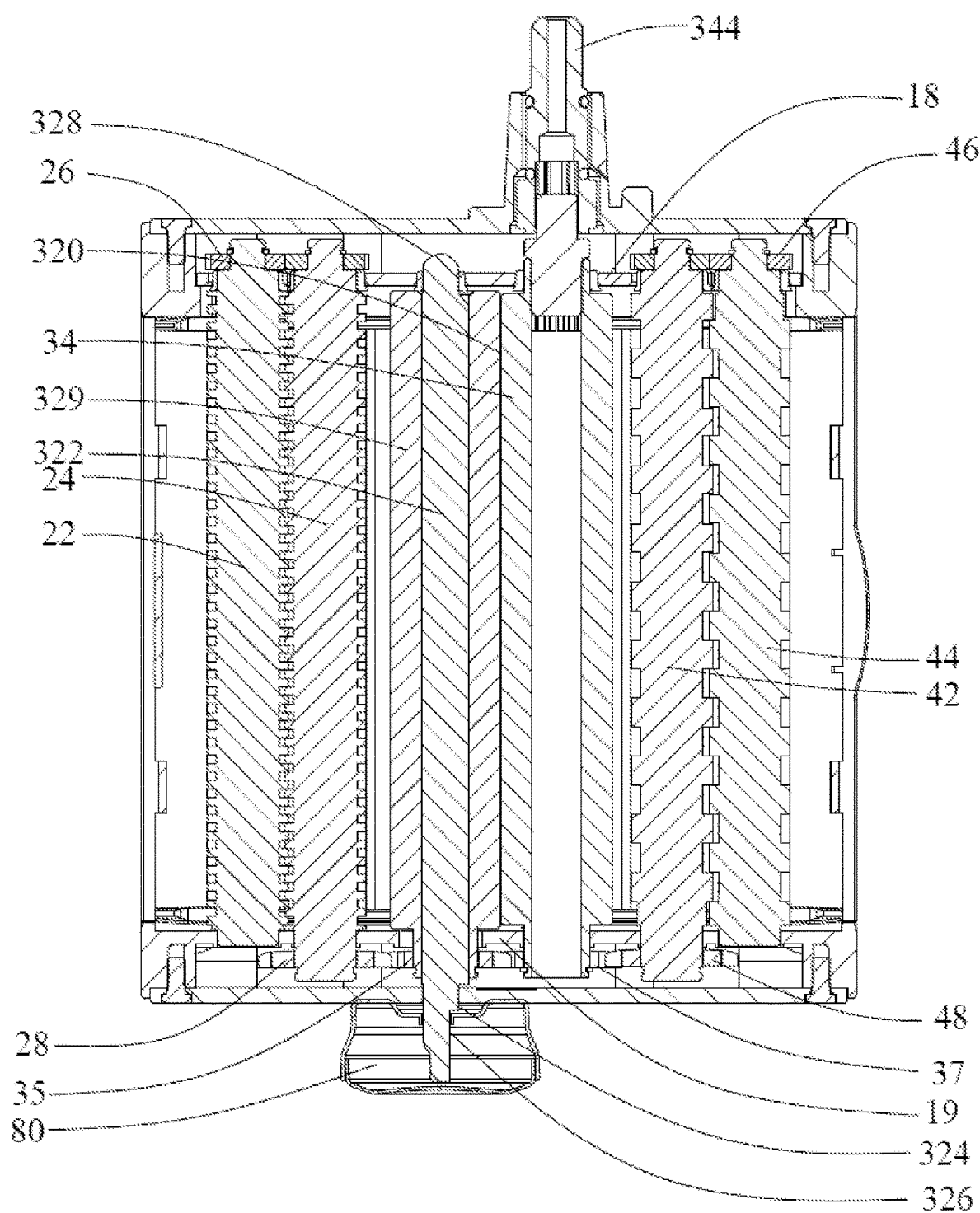
FIG. 5 is a cross-sectional view of a multifunctional automatic noodle maker in FIG. 1.
Figure 9:
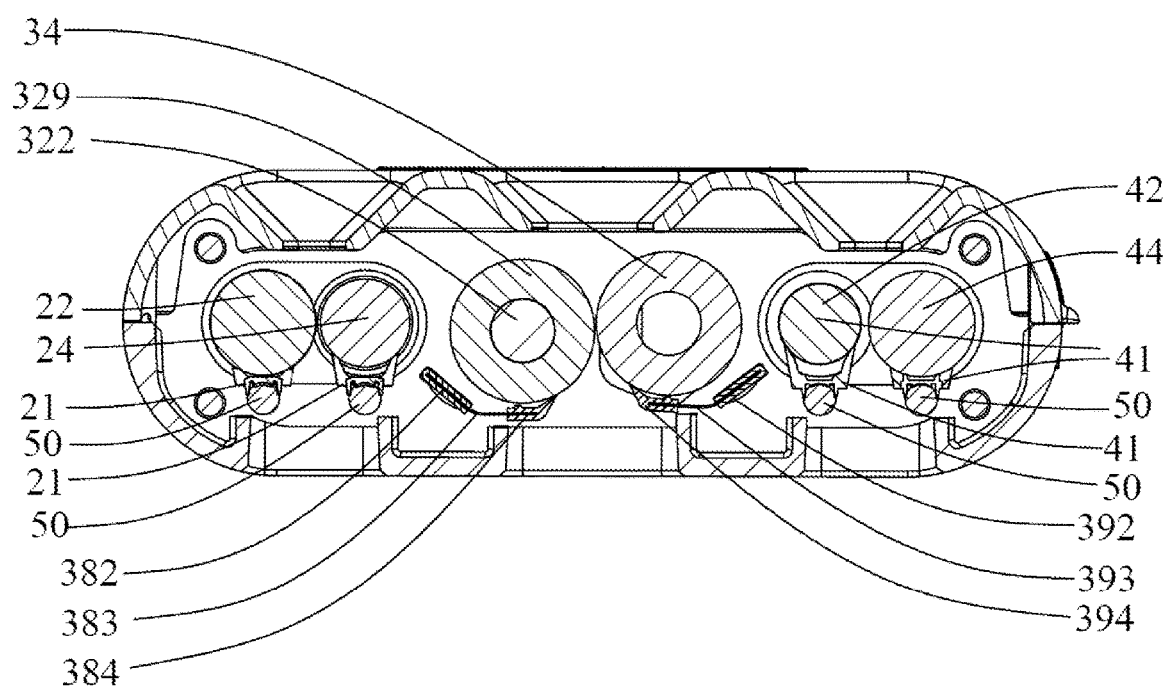
FIG. 9 is a perspective view of portions of a first cutting mechanism of a multifunctional automatic noodle maker in FIG. 1.

A top portion and a bottom portion of the housing 10 are respectively provided with a rolling inlet 124 and a rolling outlet 144 corresponding to the rolling mechanisms. The rolling inlet 124 allows a dough to enter, and the rolling outlet 144 allows a formed dough sheet to exit. The top portion and the bottom portion of the housing 10 are respectively provided with cutting inlets 122, 126 and cutting outlets 142, 146 corresponding to the cutting mechanisms 20, 40. The cutting inlets 122, 126 allow the dough sheet to enter, and the cutting outlets 142, 146 allow made noodles to exit. Reference is made to FIG. 5 and FIG. 9 which shows a perspective view of a first cutting mechanism 20 in this embodiment, wherein the first cutting roller 22 and the second cutting roller 24 are approximately cylindrical, and annular cutting grooves 244 circumferentially disposed around barrel bodies are provided in the first cutting roller 22 and the second cutting roller 24, and cutting rings 242 are formed between adjacent cutting grooves 244. In the first cutting mechanism 20, the cutting grooves 244 of each cutting roller 22 are aligned with the cutting rings 242 of another cutting roller 24, and each cutting ring 242 extends into the corresponding cutting groove 244. In the axial direction, the width of the cutting rings 242 should be slightly smaller than that of the cutting grooves 244, so that there are gaps between two side edges of the cutting rings 242 and two side walls of the corresponding cutting grooves 244 respectively. In addition, in a radial direction of the first cutting roller or the second cutting roller, there is an interval between top portions of the cutting rings 242 and bottom portions of the corresponding cutting grooves 244, and the size and the shape of the interval can define the size and the shape of the cut noodles.

Figure 10:
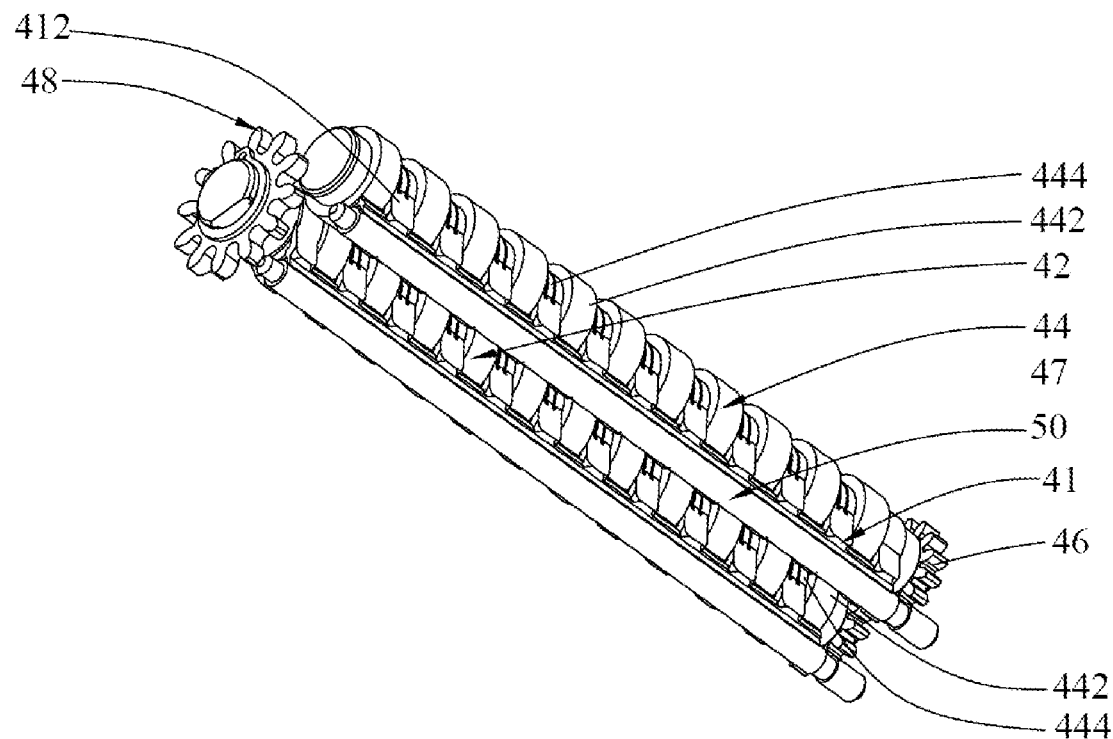
FIG. 10 is a perspective view of portions of a second cutting mechanism of a multifunctional automatic noodle maker in FIG. 1.

Similarly, FIG. 10 shows a perspective view of a second cutting mechanism 40 in this embodiment. A structure of the second cutting mechanism 40 is substantially the same as that of the first cutting mechanism 20. The third cutting roller 42 and the fourth cutting roller 44 of the second cutting mechanism 40 are substantially cylindrical, cutting grooves 444 are provided in the third cutting roller 42 and the fourth cutting roller 44, cutting rings 442 are formed between adjacent cutting grooves 444, and each cutting ring 442 is aligned with the cutting groove 444 of another cutting roller and extends into it. The second cutting mechanism 40 is different from the first cutting mechanism 20 in that the width of the cutting ring 442 and the cutting groove 444 of the third cutting roller 42 and the fourth cutting roller 44 is larger than that of the cutting groove 244 and the cutting ring 242 of the first cutting roller 22 and the second cutting roller 24. Therefore, the noodles cut by the second cutting mechanism 40 are wider than those cut by the first cutting mechanism 20.

Figure 8:
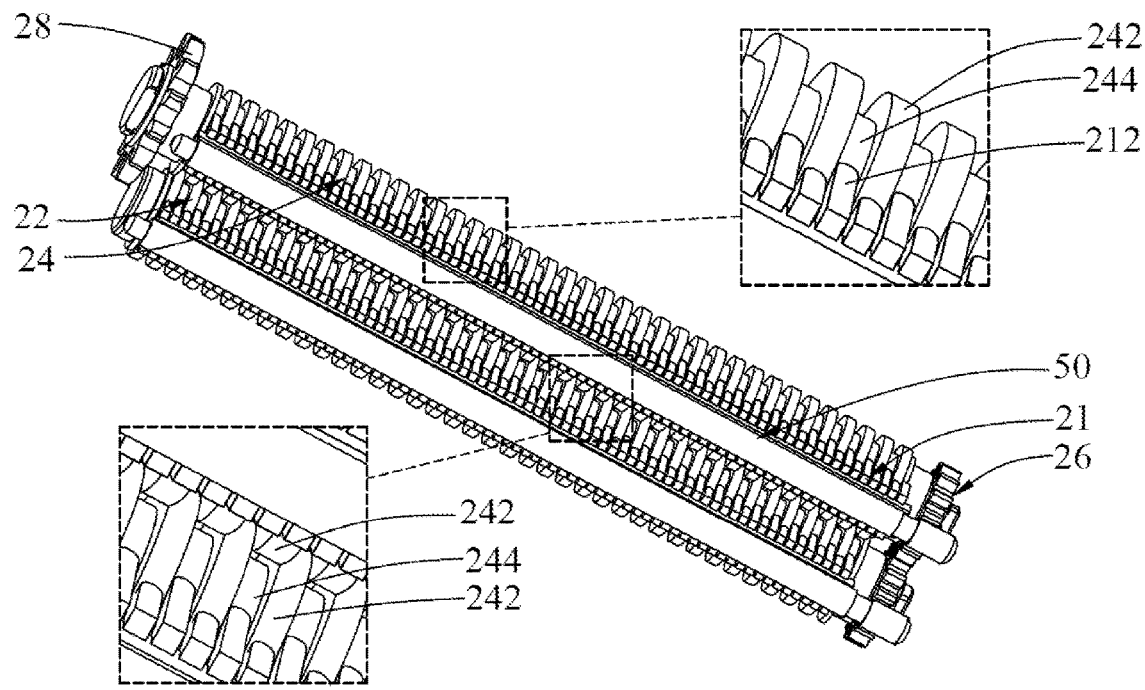
FIG. 8 is another cross-sectional view of a multifunctional automatic noodle maker in FIG. 1.

With reference to FIG. 8, FIG. 9 and FIG. 10, two guiding bars 21 are respectively arranged at bottom portions of the first cutting roller 22 and the second cutting roller 24 and are parallel to an axial direction of the first cutting roller 22 and the second cutting roller 24. A plurality of guiding blocks 212 are convexly disposed on the guiding bars 21, arranged at intervals along an axial direction of the guiding bars 21, and respectively aligned with the plurality of cutting grooves 244 of the first cutting roller 22 and the second cutting roller 24. An upper portion of each guiding block 212 extends towards the cutting inlet 122, and stretches into the corresponding cutting groove 244 and abuts against the inner side wall of the cutting groove 244 in a radial direction, and a lower portion of the guiding block 212 extends towards the cutting outlet 142 away from the upper portion of the guiding block 212. A supporting rod 50 is correspondingly disposed under each guiding bar 21. The supporting rod 50 is arranged in parallel to the guiding bar 21, and each supporting rod 50 and one of the first cutting roller 22 and the second cutting roller 24 jointly define the corresponding guiding bar 21 between the two, thereby restricting the position of the guiding bar 21. Similarly, two guiding bars 41 are respectively arranged at bottom portions of the third cutting roller 42 and the fourth cutting roller 44 and are parallel to the axial direction of the two. A structure of the guiding bar 41 is similar to that of the guiding bar 21. A plurality of guiding blocks 412 arranged at intervals along the axial direction of the guiding bar 41 are convexly disposed on the guiding bar 41, and the plurality of guiding blocks 412 are aligned with the cutting grooves 444 of the third cutting roller 42 and the fourth cutting roller 44 respectively. An upper portion of the guiding block 412 extends towards the cutting inlet 126 and abuts against the inner side of the cutting groove 444, a lower portion of the guiding block 412 extends towards the cutting outlet 146 away from the upper portion of the guiding block 412. The guiding bar 41 is different from the guiding bar 21 in that the width of the guiding block 412 of the guiding bar 41 is greater than that of the guiding block 212 of the guiding bar 21, and each guiding bar 41 is restricted between the corresponding supporting rod 50 and one of the third cutting roller 42 and the fourth cutting roller 44. The guiding block 212 and the guiding block 412 are used to provide the guidance to the cut noodles, so that the cut noodles are discharged between the first cutting roller 22 and the second cutting roller 24 or between the third cutting roller 42 and the fourth cutting roller 44. Positions of the cutting inlet 122 and the cutting outlet 142 are aligned with a position between the first cutting roller 22 and the second cutting roller 24, and positions of the cutting inlet 126 and the cutting outlet 146 are aligned with a position between the third cutting roller 42 and the fourth cutting roller 44. This enables the dough sheet to enter through the cutting inlet 122 or the cutting inlet 126. The first cutting mechanism 20 or the second cutting mechanism 40 drives the dough to enter between the two cutting rollers, and cuts the dough into noodles. The processed noodles are discharged from the cutting outlet 146 or the cutting outlet 142.

In this embodiment, cross-sectional sizes of opening of the rolling inlet 124 and the cutting inlets 122, 126 gradually decrease from the outer side of the housing 10 to the inner side of the housing 10. In this way, after the dough sheet enters between the two respective cutting rollers of the first cutting mechanism 20 and the second cutting mechanism 40, the dough sheet is squeezed in the cutting grooves and squeezed and cut by both sides of the cutting rings. Thus, the dough sheet is cut into multiple noodles, the thickness of the noodles is related to the depth of the cutting grooves, and the width of the noodles is related to the width of the cutting rings. The thickness of the noodles may be changed by adjusting the distance between the cutting rings and the bottom portions of the cutting grooves.

A substantially sheet-shaped guiding sheet 394 is disposed on a bottom portion of the driving rolling barrel 34, a substantially sheet-shaped guiding sheet 384 is disposed on a bottom portion of the driving rolling barrel 32, the guiding sheet 394 and the guiding sheet 384 extend in an axial direction of the driving rolling barrel 34 and the driven rolling barrel 32 and are arranged opposite to each other, the guiding sheet 394 and the guiding sheet 384 fit with outer peripheries of the driving rolling barrel 34 and the driven rolling barrel 32 respectively, and the guiding sheet 394 and the guiding sheet 384 are used to provide the guidance to the rolled dough sheet, so that the made dough sheet is discharged from a position between the driving rolling barrel 34 and the driven rolling barrel 32. A plate-shaped supporting sheet 382 and a plate-shaped supporting sheet 392 are fixedly connected with the housing 10, wherein the supporting sheet 382 is connected with the guiding sheet 384 through an elastically deformable elastic member 383, and the supporting sheet 392 is connected with the guiding sheet 384 through an elastically deformable elastic member 393. Therefore, the guiding sheet 384 and the guiding sheet 394 are elastically supported.

Figure 3:
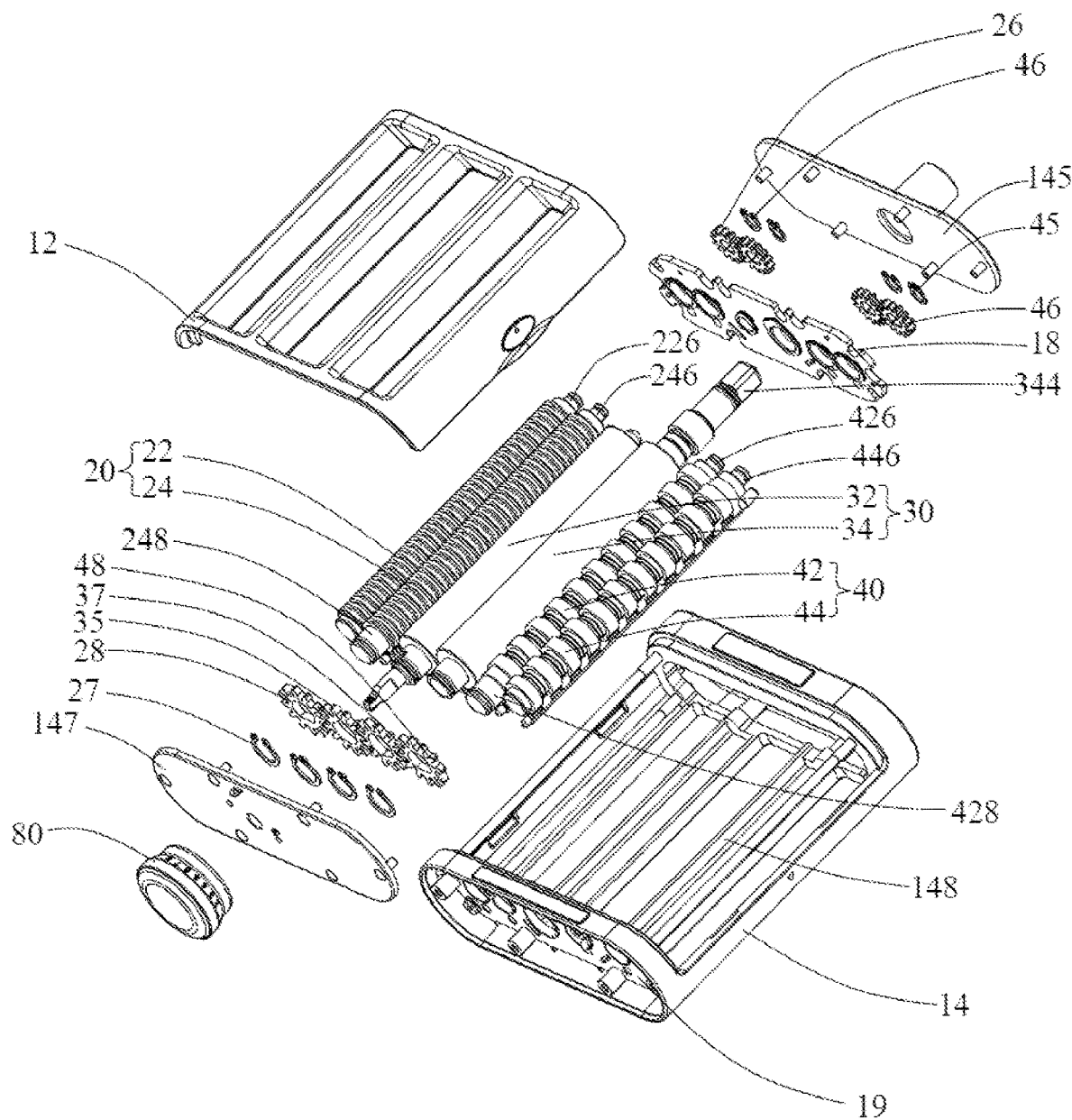
FIG. 3 is a schematic exploded perspective view of a multifunctional automatic noodle maker in FIG. 1.
Figure 4:
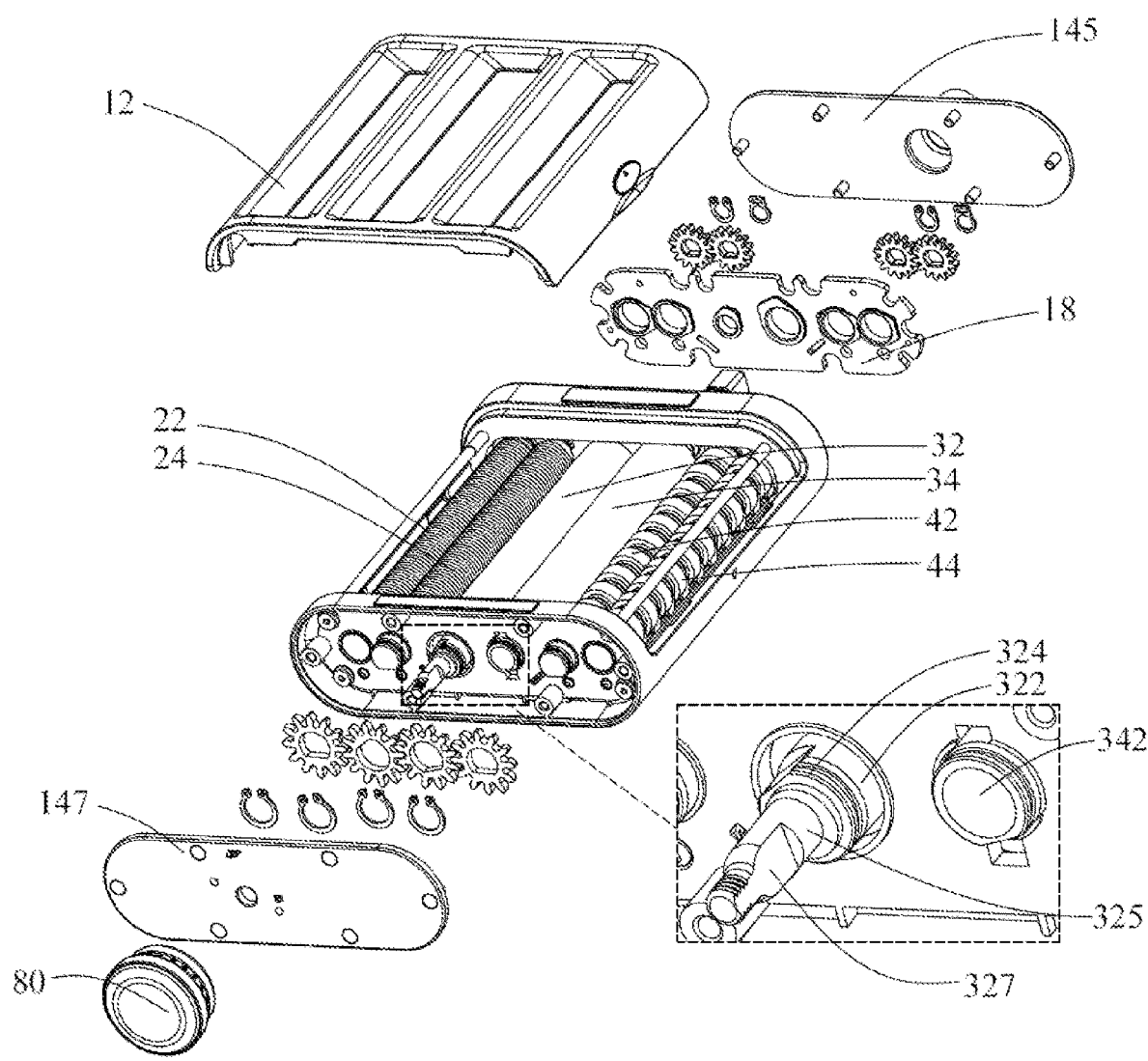
FIG. 4 is another schematic exploded perspective view of a multifunctional automatic noodle maker in FIG. 1.

A rolling spacing 320 is defined between the driving rolling barrel 34 and the driven rolling barrel 32, wherein positions of the rolling inlet 124 and the rolling outlet 144 are aligned with the rolling spacing 320 between the driving rolling barrel 34 and the driven rolling barrel 32. In this way, the dough enters through the rolling inlet 124, passes through the rolling spacing 320 under the drive of the two rolling barrels, and is squeezed into a dough sheet under the squeezing of the two rolling barrels. The dough sheet is charged from the rolling outlet 144. With reference to FIG. 3 to FIG. 5, in this embodiment, the housing 10 includes an upper housing 12 and a lower housing 14. The lower housing 14 is of a substantially rectangular parallelepiped housing shape with an opening in one side. The upper housing 12 is suitable for closing the opening. The upper housing 12 and the lower housing 14 jointly define a receiving cavity 148. The first cutting roller 22, the second cutting roller 24, the driven rolling barrel 32, the driving rolling barrel 34, the third cutting roller 42 and the fourth cutting roller 44 are arranged in the receiving cavity 148 in parallel in sequence. The lower housing 14 further includes a first mounting plate 18 and a second mounting plate 19, wherein the first mounting plate 18 and the second mounting plate 19 are respectively arranged on two sides of the driving rolling barrel 34 in an axial direction, the driving rolling barrel 34 and the driven rolling barrel 32 as well as the two respective cutting rollers of the first cutting mechanism 20 and the second cutting mechanism 40 are all disposed between the first mounting plate 18 and the second mounting plate 19, and the driving rolling barrel 34, the driven rolling barrel 32, and the two respective cutting rollers of the first cutting mechanism 20 and the second cutting mechanism 40 each have a first end and a second end, first ends of the plurality of cutting rollers as well as the first end 344 of the driving rolling barrel 34 and the first end 328 of the driven rolling barrel 32 are rotatably inserted into the first mounting plate 18, and second ends of the plurality of cutting rollers as well as the second end 342 of the driving rolling barrel 34 and the second end 324 of the driven rolling barrel 32 are rotatably inserted into the second mounting plate 19.

Figure 6:
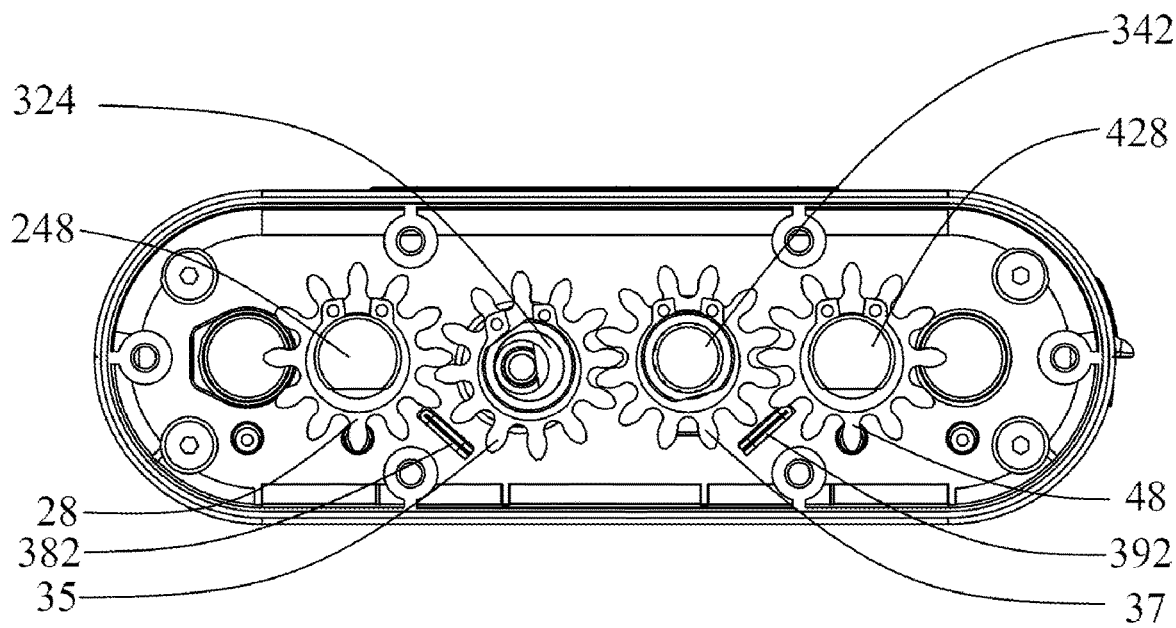
FIG. 6 is a front view of a multifunctional automatic noodle maker in FIG. 1, with a second panel and a knob removed.
Figure 7:
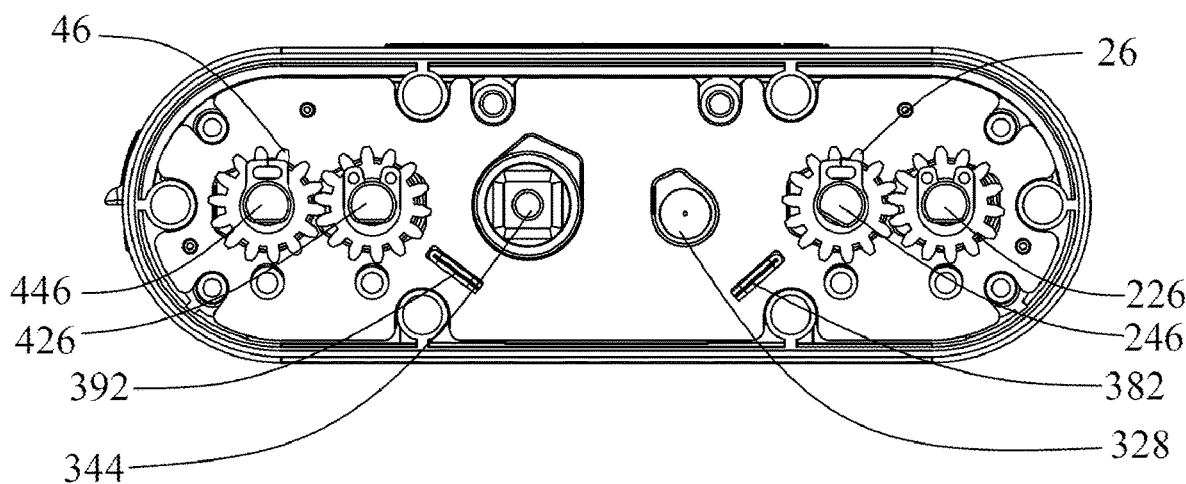
FIG. 7 is a rear view of a multifunctional automatic noodle maker in FIG. 1, with a first panel removed.

In addition, with reference to FIG. 6 and FIG. 7, a first end 226 of the first cutting roller 22, a first end 246 of the second cutting roller 24, a first end 426 of the third cutting roller 42 and a first end 446 of the fourth cutting roller 44 protrude from the first mounting plate 18 in an axial direction. A first gear set 26 and a second gear set 46 are disposed on an outer side of the first mounting plate 18, wherein the first gear set 26 includes two mutually-meshed gears, and the two gears are respectively fixedly connected with the first end 226 of the first cutting roller 22 and the first end 246 of the second cutting roller 24; and the second gear set 46 includes two mutually-meshed gears, and the two gears are respectively fixedly connected with the first end 426 of the third cutting roller 42 and the first end 446 of the fourth cutting roller 44. A second end 342 of the driving rolling barrel 34, a second end 324 of the driven rolling barrel 32, a second end 248 of the second cutting roller 24, and a second end 428 of the third cutting roller 42 all protrude from the second mounting plate 19 in an axial direction. A first gear 37, a second gear 35, a third gear 48 and a fourth gear 28 are disposed on an outer side of the second mounting plate 19, wherein the first gear 37 is fixedly connected with the second end 342 of the driving rolling barrel 34, the second gear 35 is fixedly connected with the second end 324 of the driven rolling barrel 32, the third gear 48 is fixedly connected with the second end 248 of the second cutting roller 24, and the fourth gear 28 is fixedly connected with the second end 428 of the third cutting roller 42. The third gear 48, the first gear 37, the second gear 35, and the fourth gear 28 are meshed with each other sequentially in a radial direction, so that the rotation of the driving rolling barrel 34 may result in the rotation of the driven rolling barrel 32 and the third cutting roller 42 respectively by means of meshing of the first gear 37 with the second gear 35 and the third gear 48, and the rotation of the second gear 35 results in the rotation of the second cutting roller 24 by means of meshing of the second gear 35 with the fourth gear 28. Further, the rotation of the third cutting roller 42 is transmitted to the fourth cutting roller 44 through the second gear set 46, and the rotation of the second cutting roller 24 is transmitted to the first cutting roller 22 through the first gear set 26. As a result, synchronous non-directional rotation between the driving rolling barrel 34 and the driven rolling barrel 32 can be realized, and the first cutting mechanism 20 and the second cutting mechanism 40 can be driven by the rotation of the driving rolling barrel 34. Therefore, the two respective cutting rollers of the first cutting mechanism 20 and the second cutting mechanism 40 form a synchronous non-directional rotation. In this way, for the two respective cutting rollers of the first cutting mechanism 20 and the second cutting mechanism 40, their first ends are driven by the driving rolling barrel 34 or the driven rolling barrel 32, and their second ends are meshed with each other through the first gear set 26 or the second gear set 46, so that a cutting force between the two cutting rollers is more evenly distributed along the axial direction of the cutting roller, and a better cutting effect is achieved.

In this embodiment, an outer side of the lower housing 14 is fixedly provided with a first panel 145 and a second panel 147, the first panel 145 and the first mounting plate 18 are arranged side by side and spaced apart, the first gear set 26 and the second gear set 46 are arranged between the first panel 145 and the first mounting plate 18, and the first gear set 26 and the second gear set 46 are defined by a plurality of snap springs 46 on the first ends of the plurality of cutting rollers. The second panel 147 and the second mounting plate 19 are arranged side by side and spaced apart. The first gear 37, the second gear 35, the third gear 48 and the fourth gear 28 are arranged between the second panel 147 and the second mounting plate 19, and the first gear 37, the second gear 35, the third gear 48 and the fourth gear 28 are defined by a plurality of snap springs 27 on the second ends of the plurality of cutting roller or rolling barrels. Preferably, the first ends or the second ends of the plurality of cutting rollers or rolling barrels and the corresponding gears form an anti-rotational shape fit. The first panel 145 further includes a protecting cylinder 143 extending in an axial direction of the driving rolling barrel 34, and the first end 344 of the driving rolling barrel 34 passes through and protrudes from the protecting cylinder 143.

With reference to FIG. 6, the driven rolling barrel 32 includes a movably arranged outer sleeve 329 and a center shaft 322. The center shaft 322 is disposed in the outer sleeve 329 in a penetrating manner and is arranged coaxially with the outer sleeve 329. The center shaft 322 is capable of rotating relative to the outer sleeve 329. One end of the center shaft 322 penetrates through an end portion of the outer sleeve 329 to form an operating section 325 rotatably connected to the housing 10, and the operating section 325 and the center shaft 322 are eccentrically arranged. The operating section 325 rotates to drive the center shaft 322 to rotate eccentrically, and the center shaft 322 eccentrically rotates to drive the driven rolling barrel 32 to move towards or away from the driving rolling barrel 34. In this way, a user may drive the driven rolling barrel 32 to move towards or away from the driving rolling barrel 34 by rotating the operating section 325, so as to achieve a variation in the rolling spacing 320 between the driving rolling barrel 34 and the driven rolling barrel 32 and control the thickness of the dough sheet.

With reference to FIG. 1 again, in this embodiment, a knob 80 is fixedly connected to the operating section 325. The operating section 325 is movably disposed in the knob 80 in a penetrating manner, and a positioning port 327 that restricts the rotation of the knob 80 relative to the operating section 325 is provided in the operating section 325. The positioning port 327 is an axially extending cut formed in the end portion of the operating section 325, and a receiving groove matched with the cut in shape is formed in the knob 80, so that the knob 80 and the operating section 325 are prevented from rotating relative to each other. Preferably, scales 81 are disposed on the knob 80, and a pointer 149 is fixedly disposed on the housing 10. Therefore, when the pointer 149 corresponds to different scales 81, the rolling spacings 320 are different in sizes, which brings the convenience for the user to adjust.

Figure 11:
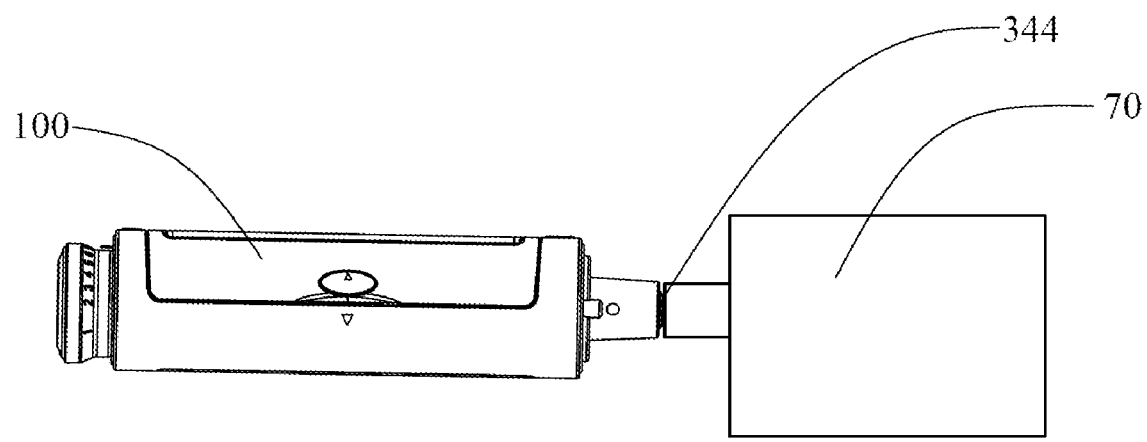
FIG. 11 is a schematic diagram of a connection between a multifunctional automatic noodle maker in FIG. 1 and a motor.

With reference to FIG. 1 and FIG. 11. The first end 344 of the driving rolling barrel 34 extends to the outer side of the housing 10, and the first end 344 of the driving rolling barrel 34 is connected with a motor 70. The motor 79 is used to drive the driving rolling barrel 34 to rotate, which in turn causes the two respective cutting rollers of the first cutting mechanism 20 and the second cutting mechanism 40 to rotate. In this embodiment, a cross section of the first end 344 of the driving rolling barrel 34 in a radial direction is a square, which brings the convenience for connection with an output shaft or a coupling of the motor. It should be understood that the first end may further include other shapes, such as shapes with key grooves or with external threads. However, a motor driving portion and a gear meshing portion are arranged between the driving rolling barrel and the driven rolling barrel separately, which can make a rolling pressure between the driving rolling barrel and the driven rolling barrel more balanced, so as to make the rolled dough sheet more uniform in thickness. The same motor is used to drive a plurality of rolling barrels and a plurality of sets of cutting mechanisms to rotate, resulting in the reduction of the need for the motors and making the structure of the entire automatic noodle maker more compact.

The multifunctional automatic noodle maker provided above is capable of rolling the dough into a dough sheet by providing the rolling mechanisms, and is provided with a plurality of sets of cutting mechanisms with different cutting grooves. In this way, it is necessary for suitable cutting mechanisms to cut the dough sheet according to actual needs. The dough sheet may be squeezed and noodles with different widths can be made on the same noodle maker at the same time. Therefore, the multifunctional automatic noodle maker has multiple functions and wide applicability.

The foregoing is only preferred embodiments of the present invention and is not intended to limit the present invention. Any modifications, equivalent substitutions and improvements made within the spirit and principle of the present invention shall be included in the scope of protection of the present invention.

What is claimed is:

1. A multifunctional automatic noodle maker, comprising:
a housing; a rolling mechanism disposed inside the housing, wherein the rolling mechanism comprises two rolling barrels, and the two rolling barrels are arranged in parallel and spaced apart, and a rolling spacing is defined between the two rolling barrels; and
a plurality of sets of cutting mechanisms, wherein each set of the plurality of sets of cutting mechanisms comprises two cutting rollers which are arranged in parallel and spaced apart, cutting grooves surrounding a circumferential direction of each cutting roller is disposed on the cutting roller, and cutting rings are formed between adjacent cutting grooves; in each set of cutting mechanisms, the cutting grooves of any cutting roller are aligned with the cutting rings of another cutting roller, wherein the cutting grooves of the plurality of sets of cutting mechanisms are different in widths;
wherein a rolling inlet corresponding to the rolling mechanism is provided in a top portion of the housing, and a rolling outlet corresponding to the rolling mechanism is provided in a bottom portion of the housing; and a plurality of cutting inlets corresponding to the cutting mechanisms are provided in the top portion of the housing, and cutting outlets corresponding to the cutting mechanisms are provided in the bottom portion of the housing;

the multifunctional automatic noodle maker further comprises a motor, wherein the two rolling barrels comprise a driving rolling barrel and a driven rolling barrel, the driving rolling barrel has a first end and a second end which are opposite, the driven rolling barrel has a first end and a second end which are opposite, the first end of the driving rolling barrel and the first end of the driven rolling barrel are arranged in the same direction, the second end of the driving rolling barrel and the second end of the driven rolling barrel are arranged in the same direction, the first end of the driving rolling barrel extends to an outer side of the housing and is connected with the motor, the motor drives the driving rolling barrel to rotate, the second end of the driving rolling barrel is in driving connection with the second end of the driven rolling barrel, and the driving rolling barrel and the driven rolling barrel roll in different directions synchronously;

wherein the plurality of sets of cutting mechanisms comprise a first cutting mechanism and a second cutting mechanism, the first cutting mechanism and the second cutting mechanism are respectively arranged on two sides of the two rolling barrels, the second end of the driving rolling barrel is connected with and used to drive one cutting roller adjacent to it in the second cutting mechanism via a plurality of gears, and the second end of the driven rolling barrel is connected with and used to drive one cutting roller adjacent to it in the first cutting mechanism via the plurality of gears;

wherein the housing comprises an upper housing and a lower housing, the multifunctional automatic noodle maker further comprises a first panel and a second panel which are disposed on the lower housing.

2. The multifunctional automatic noodle maker according to claim 1, wherein within each cutting mechanisms, the two cutting rollers each have a first end and a second end opposite to the first end, a first end of each cutting roller and the first end of the driving rolling barrel are arranged in the same direction, and the first ends of the two cutting rollers are in driving connection with each other.

3. The multifunctional automatic noodle maker according to claim 1, wherein two sides of each cutting outlet of the housing are respectively provided with two guiding bars, and two of the guiding bars are arranged to respectively extend along an axial direction of two of the cutting rollers positioned at two sides of the cutting outlet, a plurality of guiding blocks are convexly arranged on the guiding bars, and the plurality of guiding blocks are arranged at intervals along an axial direction of the guiding bars, the plurality of guiding blocks are aligned with the plurality of cutting grooves of the cutting rollers, an upper portion of each guiding block extends into a corresponding cutting groove and abuts against an inner side wall of the cutting groove in a radial direction, and a lower portion of the guiding block extends towards the cutting outlet.

4. The multifunctional automatic noodle maker according to claim 1, wherein two sides of the rolling outlet of the housing are respectively provided with two guiding sheets, and two of the guiding sheets are arranged to respectively extend along an axial direction of the rolling barrels positioned on two sides of the rolling outlet, and the two guiding sheets respectively fit with the two rolling barrels.

5. The multifunctional automatic, noodle maker according to claim 1, wherein in each of the cutting mechanisms, the cutting rings of any cutting roller are embedded in the cutting grooves of another cutting roller, an interval is provided between top portions of the cutting rings and bottom portions of the corresponding cutting grooves in a radial direction of the cutting rollers, and gaps are provided between two side edges of the cutting rings and two side walls of the corresponding cutting grooves in an axial direction of the cutting rollers.

6. The multifunctional automatic noodle maker according to claim 1, wherein the driven rolling barrel comprises an outer sleeve and a center shall, wherein the center shaft and the outer sleeve are arranged coaxially, the center shall is disposed in the outer sleeve in a penetrating manner and is capable of rotating relative to the outer sleeve, and one end portion of the center shaft passes through an end portion of the outer sleeve, so that an operating section rotatably connected onto the housing is formed; and the operating section and the center shaft are eccentrically arranged, the operating section rotates to drive the center shaft to eccentrically rotate, and the center shaft eccentrically rotates to drive the driven rolling barrel to move towards or away from the driving rolling barrel.

7. The multifunctional automatic noodle maker according to claim 1, wherein the plurality of gears includes a first gear fixed on the second end of the driving rolling barrel, a second gear fixed on the second end of the driven rolling barrel, a third gear fixed on the cutting roller which is in driving connection with the second end of the driving rolling barrel, a fourth gear fixed on the cutting roller which is in driving connection with the second end of the driven rolling barrel, the third gear, the first gear, the second gear and the fourth gear being arranged in sequence in a radial direction and meshed with each other, wherein first ends of the two cutting rollers of each of the cutting mechanism are in driving connection by one set of the plurality of gears.

8. The multifunctional automatic noodle maker according to claim 7, wherein an opening is provided in one side of the lower housing, the upper housing is adapted to be connected with the lower housing and to close the opening, the upper housing and the lower housing jointly surround and define a receiving cavity, and the rolling mechanism and the plurality of cutting mechanisms are arranged side by side in the receiving cavity.

9. The multifunctional automatic noodle maker according to claim 8, wherein the lower housing comprises a first mounting plate and a second mounting plate that are arranged oppositely, wherein the first end of the driving rolling barrel, the first end of the driven rolling barrel and first ends of two cutting rollers of each of the cutting mechanisms are rotatably disposed in the first mounting plate in a penetrating manner, the second end of the driving rolling barrel, the second end of the driven rolling barrel, and second ends of the two cutting rollers of each of the cutting mechanisms are rotatably disposed in the second mounting plate in a penetrating manner.

10. The multifunctional automatic noodle maker according to claim 9, wherein the first panel and the first mounting plate are arranged side by side and spaced apart, and at least two mutually-meshed gears of the plurality of gears are disposed between the first panel and the first mounting plate; and the second panel and the second mounting plate are arranged side by side and spaced apart, and at least two mutually-meshed gears of the plurality of gears are disposed between the second panel and the second mounting plate.

11. The multifunctional automatic noodle maker according to claim 1, wherein cross-sectional sizes of openings of the rolling inlet and the cutting inlets gradually decrease from an outer side of the housing to an inner side of the housing.

12. The multifunctional automatic noodle maker according to claim 3, further comprising a plurality of supporting rods, wherein each of the supporting rods is arranged corresponding to one of the guiding bars, and each of the supporting rods and one of the cutting rollers jointly define one of the guiding bars between the supporting rod and the cutting roller.

13. The multifunctional automatic noodle maker according to claim 4, further comprising two supporting sheets, wherein each of the supporting sheets is connected with one of the guiding sheets through an elastically deformable elastic member.

14. The multifunctional automatic noodle maker according to claim 6, further comprising a knob, wherein the knob is fixedly connected with the operating section of the center shaft.

15. The multifunctional automatic noodle maker according to claim 1, wherein a cross section of the first end of the driving rolling barrel is square.

16. The multifunctional automatic noodle maker according to claim 14, wherein the knob comprises measuring scales arranged in a rotating direction, and a pointer aligned with the measuring scale is disposed on the second panel.

17. The multifunctional automatic noodle maker according to claim 6, wherein the operating section further comprises a positioning port extending in an axial direction of the center shaft.

18. The multifunctional automatic noodle maker according to claim 17, wherein the first panel further comprises a protecting cylinder extending in an axial direction of the driving rolling barrel, and the first end of the driving rolling barrel passes through and protrudes from the protecting cylinder.

* * * * *